United States Patent
Rossario et al.

(10) Patent No.: US 8,549,361 B2
(45) Date of Patent: Oct. 1, 2013

(54) SYSTEM AND METHOD FOR CONSTRUCTION, FAULT ISOLATION, AND RECOVERY OF CABLING TOPOLOGY IN A STORAGE AREA NETWORK

(75) Inventors: Britto Rossario, Bangalore (IN); Mahmoud K Jibbe, Wichita, KS (US)

(73) Assignee: Netapp, Inc., Sunnyvale, CA (US)

( * ) Notice: Subject to any disclaimer, the term of this patent is extended or adjusted under 35 U.S.C. 154(b) by 370 days.

(21) Appl. No.: 12/973,953

(22) Filed: Dec. 21, 2010

(65) Prior Publication Data
US 2012/0159252 A1 Jun. 21, 2012

(51) Int. Cl.
*G06F 11/00* (2006.01)

(52) U.S. Cl.
USPC .............................................. 714/43; 709/222

(58) Field of Classification Search
USPC .................. 714/3, 4.1, 4.5, 43; 709/220, 222
See application file for complete search history.

(56) References Cited

U.S. PATENT DOCUMENTS

| | | | | |
|---|---|---|---|---|
| 5,835,720 | A * | 11/1998 | Nelson et al. | 709/224 |
| 6,636,981 | B1 * | 10/2003 | Barnett et al. | 714/4.5 |
| 6,834,298 | B1 * | 12/2004 | Singer et al. | 709/220 |
| 6,839,754 | B2 * | 1/2005 | Nowak et al. | 709/224 |
| 7,137,039 | B2 * | 11/2006 | Durrant et al. | 714/47.2 |
| 7,194,538 | B1 * | 3/2007 | Rabe et al. | 709/224 |
| 7,203,730 | B1 * | 4/2007 | Meyer et al. | 709/213 |
| 7,272,848 | B1 * | 9/2007 | Meyer et al. | 726/1 |
| 7,287,269 | B2 | 10/2007 | Burton et al. | |
| 7,617,320 | B2 * | 11/2009 | Alon et al. | 709/229 |
| 2003/0055932 | A1 * | 3/2003 | Brisse | 709/223 |
| 2003/0237017 | A1 * | 12/2003 | Jibbe | 714/4 |
| 2004/0006612 | A1 * | 1/2004 | Jibbe et al. | 709/223 |
| 2004/0075680 | A1 * | 4/2004 | Grace et al. | 345/734 |
| 2004/0080527 | A1 * | 4/2004 | Elliott | 345/734 |
| 2004/0228290 | A1 * | 11/2004 | Graves | 370/257 |
| 2006/0106819 | A1 * | 5/2006 | Dhanadevan et al. | 707/100 |
| 2006/0274760 | A1 * | 12/2006 | Loher | 370/395.52 |
| 2007/0011319 | A1 * | 1/2007 | McClure et al. | 709/224 |
| 2007/0094378 | A1 * | 4/2007 | Baldwin et al. | 709/223 |
| 2007/0237141 | A1 | 10/2007 | Marchese | |
| 2008/0123536 | A1 * | 5/2008 | Johnson et al. | 370/241 |
| 2012/0079107 | A1 * | 3/2012 | Williams et al. | 709/224 |

OTHER PUBLICATIONS

Hwa-Chun Lin et al., Automatic Link Layer Topology Discovery of IP Networks,National Tsing Hua University,IEEE, entire document, Taiwan, 1999.

Alessio Botta et al., Design, Implementation, and Testing of a Hybrid Tool for Network Topology Discovery, University of Napoli,Mar. 28, 2007,entire document, Italy.

* cited by examiner

*Primary Examiner* — Marc Duncan
(74) *Attorney, Agent, or Firm* — Haynes and Boone, LLP

(57) ABSTRACT

System and method for construction, fault isolation, and recovery of cabling topology in a storage area network (SAN) is disclosed. In one embodiment, in a method for construction, fault isolation, and recovery of cabling topology in a SAN, subsystem information associated with each subsystem in the SAN is obtained. Then, an IP port and zoning information associated with connections of each subsystem is obtained. Component information associated with each component is also obtained. Any other relevant information associated with each subsystem and each component is obtained from users. The obtained subsystem information, IP port and zoning information, component information, and any other relevant information are compiled. Test packets are then sent from end-to-end in SAN using compiled information. The sent test packets are tracked via each component in each subsystem in the SAN. The cabling topology of the SAN is then outputted based on the outcome of the tracking.

20 Claims, 11 Drawing Sheets

SYSTEM AND METHOD FOR CONSTRUCTION, FAULT ISOLATION, AND RECOVERY OF CABLING TOPOLOGY IN A STORAGE AREA NETWORK

FIELD OF TECHNOLOGY

Embodiments of the present subject matter relate to the storage area network infrastructure. More particularly, embodiments of the present subject matter relate to the storage area network cabling topology.

BACKGROUND

In existing scenarios, storage area network (SAN) infrastructure is becoming more and more complex due to large number of storage subsystems, multi protocol and multi vendor components, and complexities involved in data synchronization in the SAN. A fault in a segment of a subsystem in the SAN may be very difficult to be identified and corrected because of the complexity. For example, miswiring and/or improper cabling may be a big problem in the SAN where a significantly large number of cables are used to connect between the subsystems and systems and may increase the probability of cable connectivity issues during a configuration setup. Further, cabling schemes used in SANs can vary significantly based on infrastructure design deployed by end uses.

In such a scenario, if proper cabling schemes are not followed, redundancy of input/output (IO) path may be lost. Using existing management module, an administrator can track the subsystems and the systems; however, the administrator cannot identify miswiring and/or improper cabling. In these situations, the administrator has to manually inspect the cable connectivity to determine any miswiring and/or improper wiring and to correct them. This can be very intensive and time consuming task due to complexity in the cabling in the SAN.

SUMMARY

System and method for construction, fault isolation, and recovery of cabling topology in a storage area network (SAN) is disclosed. According to one aspect of the present subject matter, in a method for construction, fault isolation, and recovery of cabling topology in a SAN, subsystem information associated with each subsystem in the SAN is obtained using its respective internet protocol (IP) address by a cabling topology construction, fault isolation and recovery (CTCFIR) module residing in a management server connected to the SAN. An IP port and zoning information associated with connections of each subsystem in the SAN is also obtained by the CTCFIR module. Then, component information associated with each component in each subsystem in the SAN is obtained by sending commands by the CTCFIR module.

Any other relevant information associated with each subsystem and each component from users is also obtained. The obtained subsystem information, the IP port and zoning information, the component information, and any other relevant information obtained from the users are complied. Test packets are sent from end-to-end in the SAN using the compiled information. The sent test packets are tracked via each component in each subsystem in the SAN. Then, the cabling topology of the SAN is outputted based on the outcome of the tracking. Further, a point of failure is declared for one or more the IO paths if associated test packets are not returned within a predetermined time to the CTCFIR module.

According to another aspect of the present subject matter, a non-transitory computer-readable storage medium for construction, fault isolation, and recovery of cabling topology in a SAN has instructions that, when executed by a computing device causes the computing device to perform the method described above.

According to yet another aspect of the present subject matter, a SAN system includes a SAN, a management server coupled to the SAN via a network, and a management module residing in the management server. The management module includes a CTCFIR module. The SAN includes a plurality of subsystems, where each subsystem includes a plurality of components. The SAN further includes a plurality of databases, and the plurality of subsystems, the plurality of components, and the plurality of databases are communicatively coupled via cables. The CTCFIR module obtains subsystem information associated with each subsystem in the SAN using its respective IP address. The CTCFIR also obtains IP port and zoning information associated with connections of each subsystem in the SAN. Then, the CTCFIR module obtains component information associated with each component in each subsystem in the SAN by sending SCSI commands.

The CTCFIR module also obtains any other relevant information associated with each subsystem and component from users, and compiles the obtained subsystem information, the IP port and zoning information, the obtained component information, and any other relevant information obtained from the users. Then, the CTCFIR module sends test packets from end-to-end in the SAN using the compiled information, and tracks the sent test packets via each component in each subsystem in the SAN. The cabling topology of the SAN is outputted by the CTCFIR module based on the outcome of the tracking.

The methods, and systems disclosed herein may be implemented in any means for achieving various aspects, and other features will be apparent from the accompanying drawings and from the detailed description that follow.

BRIEF DESCRIPTION OF THE DRAWINGS

Various embodiments are described herein with reference to the drawings, wherein.

The drawings described herein are for illustration purposes only and are not intended to limit the scope of the present subject matter in any way.

DETAILED DESCRIPTION

System and method for construction, fault isolation, and recovery of cabling topology in a storage area network (SAN) is disclosed. In the following detailed description of the embodiments of the present subject matter, reference is made to the accompanying drawings that form a part hereof, and in which are shown by way of illustration specific embodiments in which the present subject matter may be practiced. These embodiments are described in sufficient detail to enable those skilled in the art to practice the present subject matter, and it is to be understood that other embodiments may be utilized and that changes may be made without departing from the scope of the present subject matter. The following detailed description is, therefore, not to be taken in a limiting sense, and the scope of the present subject matter is defined by the appended claims.

Figure 1:
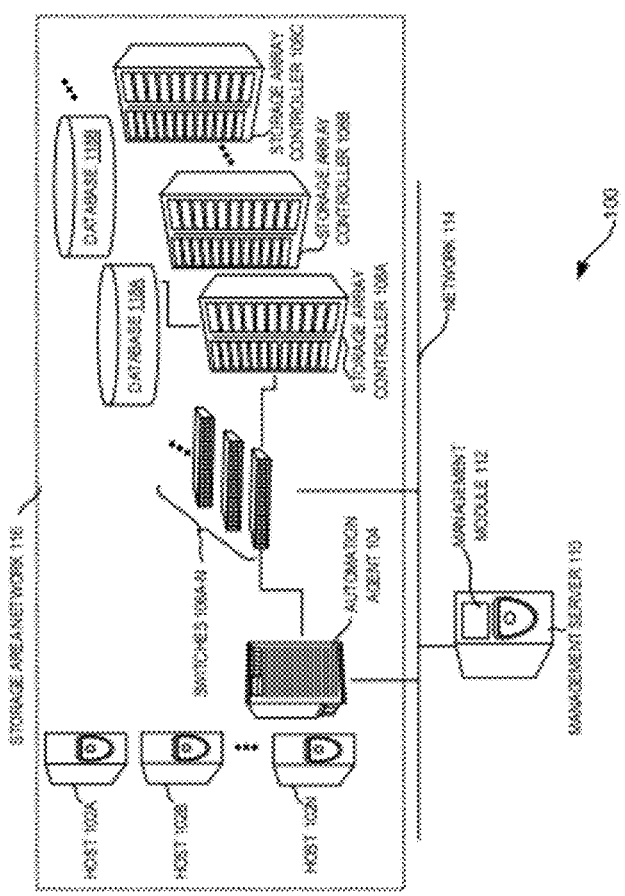
FIG. 1 illustrates a block diagram of a storage area network (SAN), including major systems, according to one embodiment.

FIG. 1 illustrates a block diagram 100 of a storage area network (SAN) 116, including major systems, according to one embodiment. As shown, the SAN 116 includes subsystems where each of the subsystems includes components. The subsystems include hosts 102A-N, switches 106A-N, storage array controllers 108A-N, and databases 118A-N. Exemplary components may include but not limited to disk trays, disk drives, and drive slots. It can be seen that, all the subsystems in the SAN 116 are communicatively coupled via cables. Further, it can be seen that, the SAN 116 is coupled to a management server 110 via a network 114. The management server 110 includes a management module 112, as shown in the figure. According to an embodiment of the present subject matter, the management module 112 enables construction, fault isolation, and recovery of cabling topology in the SAN 116.

Figure 2:
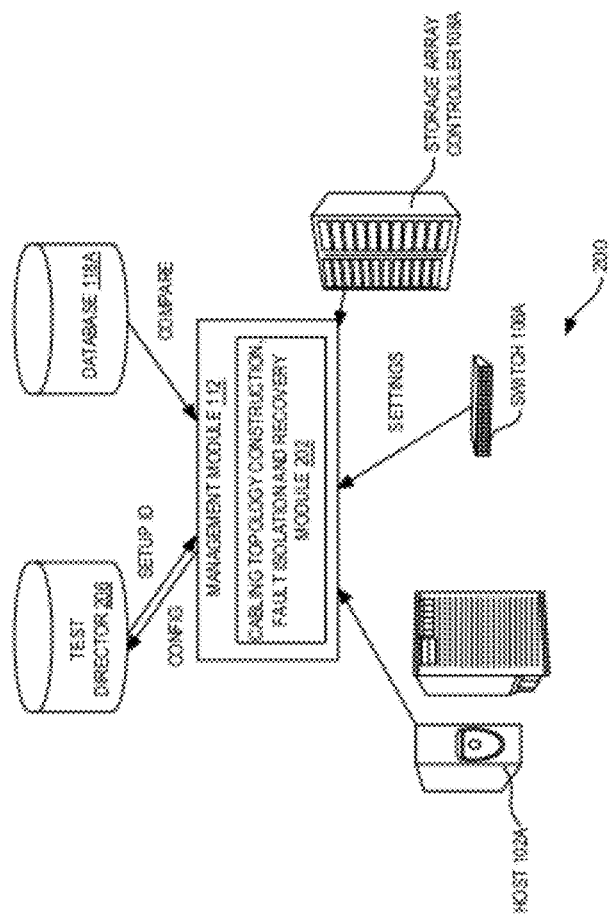
FIG. 2 is a block diagram showing the management module including a cabling topology construction, fault isolation, and recovery (CTCFIR) module obtaining hardware and firmware information from each of the subsystems in the SAN, according to one embodiment.

FIG. 2 is a block diagram 200 showing the management module 112 including a cabling topology construction, fault isolation, and recovery (CTCFIR) module 202 obtaining hardware and firmware information from each of the subsystems in the SAN 116, according to one embodiment. As shown, the management module 112 is coupled to a host 102A, a switch 106A, a storage array 108A, a database 118A, and a test director 206. In one embodiment, the CTCFIR module 202 obtains subsystem information (e.g., hardware, firmware, driver and applications software information) associated with each subsystem in the SAN 116 using its respective internet protocol (IP) address. The CTCFIR module 202 also obtains an IP port and zoning information associated with connections of each subsystem in the SAN 116. The CTCFIR module 202 further obtains component information associated with each component in each subsystem in the SAN 116 by sending commands. In one example embodiment, commands are SCSI commands. The component information includes subsystem name, type of operating system, fail over information, storage tray connected with each storage array, storage array model information, switch model information, cabling harness details, and logon credentials.

The CTCFIR module 202 also obtains any other relevant information associated with each subsystem and component from users. Then, the CTCFIR module 202 compiles the obtained subsystem information, IP port and zoning information, the component information, and any other relevant information obtained from the users. Further, the CTCFIR module 202 sends test packets from end-to-end in the SAN 116 using the compiled information. The CTCFIR module 202 also tracks the sent test packets via each component in each subsystem in the SAN 116 and based on the outcome of the tracking, the CTCFIR module 202 outputs the cabling topology of the SAN 116.

For example, the subsystem information is obtained as follows. The hardware, firmware, driver, and application software information associated with each subsystem in the SAN 116 are obtained. The obtained hardware, firmware, driver and applications software information are compared with a list of recommended firmware and application software information present in the database 118A. Then, results of the comparison including any discrepancies found in the firmware, driver, and application software information are outputted.

Figure 3:
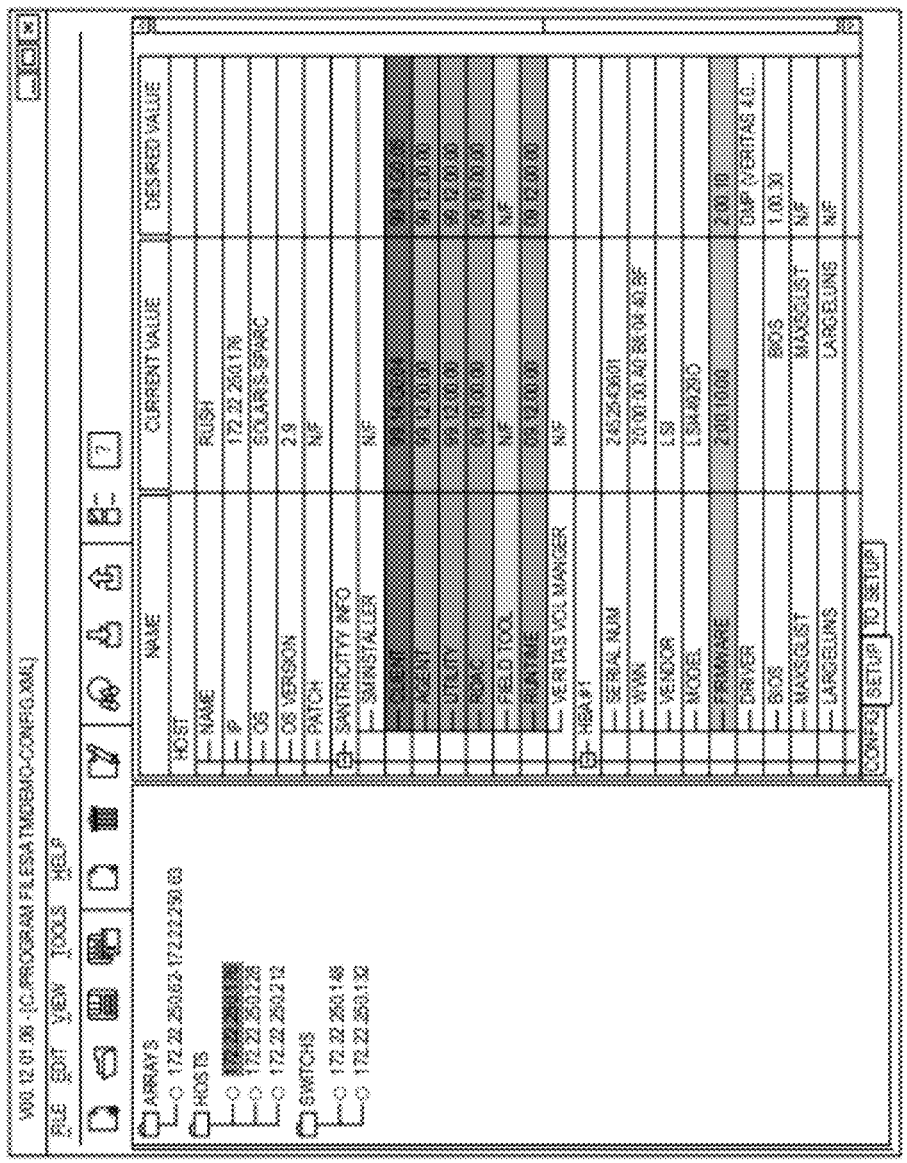
FIG. 3 Illustrates a screenshot showing results of the comparison of the subsystem information in an XML format obtained using the CTCFIR module, according to one embodiment.

FIG. 3 Illustrates a screenshot 300 showing results of the comparison of the subsystem information in an XML format obtained using the CTCFIR module 202, according to one embodiment. The CTCFIR module 202 obtains the subsystem information from the SAN 116 and compares with the list of recommended firmware, driver and application software information present in the databases 118A-N. Then, results of the comparison including any discrepancies found in the firmware, driver, and application software information are outputted in the XML format.

Figure 4:
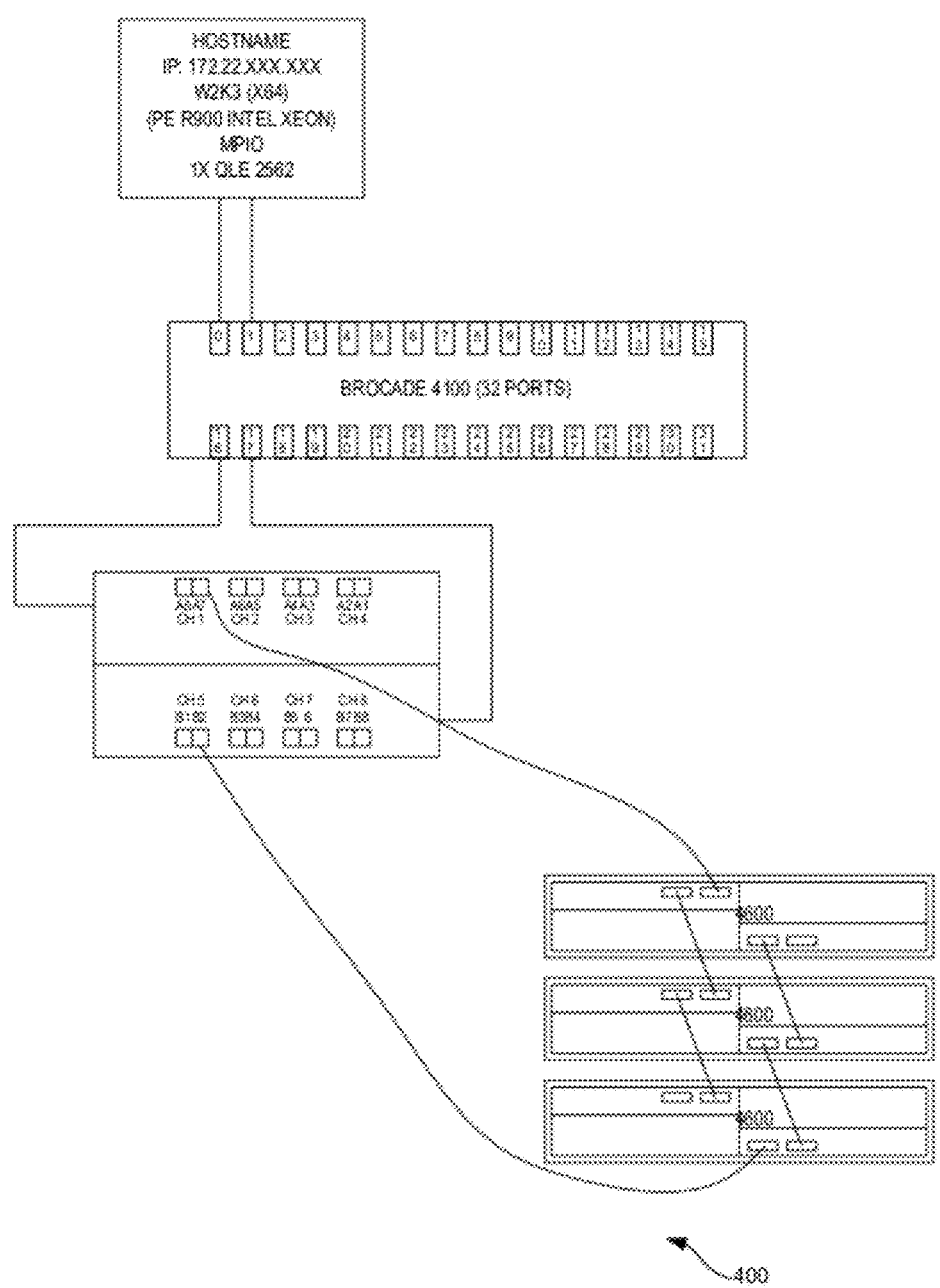
FIG. 4 is a block diagram showing the constructed cabling topology of the SAN having no faults using the CTCFIR module, according to one embodiment.

FIG. 4 is a block diagram 400 showing the constructed cabling topology of the SAN 116 having no faults using the CTCFIR module 202, according to one embodiment. The subsystem information in the SAN 116 is obtained using its respective IP addresses. Using the list of recommended firmware, driver, and application software information in the databases 118A-N, the CTCFIR module 202 compares, and finds out any discrepancies in the cabling topology of the SAN 116.

Figure 5:
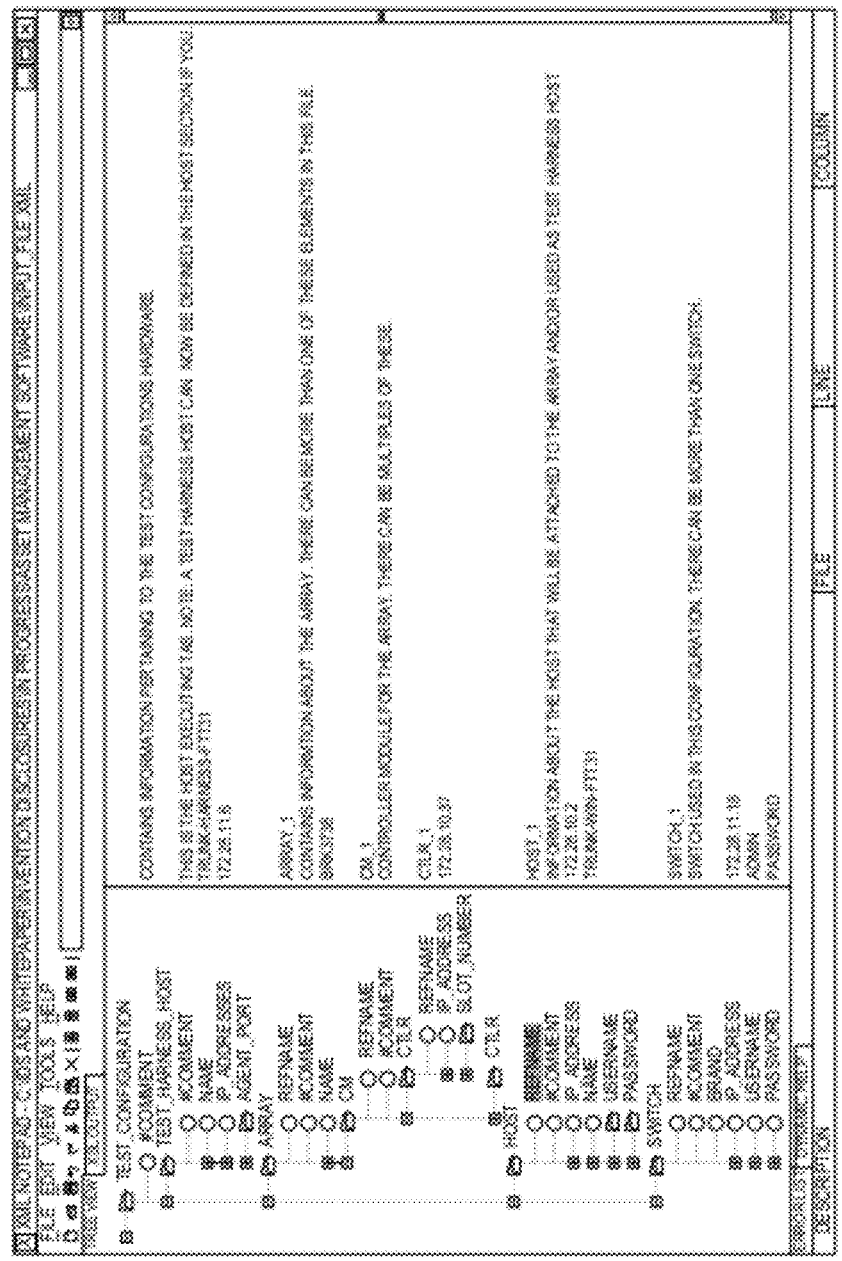
FIGS. 5 and 6 illustrate generated existing and desired cabling connectivity information of the SAN in an XML format using the CTCFIR module, according to one embodiment.
Figure 6:

FIGS. 5 and 6 illustrate generated existing and desired cabling connectivity information of the SAN 116 in an XML format using the CTCFIR module 202, according to one embodiment. The existing cabling connectivity information is obtained by obtaining the subsystem information of each subsystem in the SAN 116. For example, information such as subsystem name, type of operating system, fail over information, storage tray connected with each storage array, storage array model information, switch model information, cabling harness details, and logon credentials, and the like are obtained by the CTCFIR module 202.

Then, a table or XML file of associated modules is generated and an order/sequence of connectivity is also maintained. In one example, this is done by sending a test packet through the IO path from hosts and then tracking the paths, finding the association and deriving the way in which the subsystems are connected to each other. If the test packet does not return, a point of failure is declared. The last point to which the test packet traveled is considered to be the point of failure and is reported in a user interface (UI).

Further, if an input port of one side of a drive tray is connected to a successive input port or output port to a successive output port, this may be treated as a fault and is reported in the UI. If a faulty cable is connected, the connection is open and any open connection between the successive input ports and output ports may be tabulated. Based on the above mentioned scenario and the output of the connection tracing, an XML file showing existing cabling connectivity is generated with all the details of the existing configuration setup.

An XML file with the desired cabling connectivity which includes proper connection and wiring information is also generated. The XML file may be generated based on the details of components present in the SAN 116 and applying wiring rules for a desired way of connection. This is based on the details of number of hosts, switches, storage array controllers, and drive trays connected in a configuration of the SAN 116.

The connection details in the XML file showing existing cabling connectivity is drawn and shown pictorially in the UI. The connection details obtained from the XML file showing desired cabling connectivity is super-imposed on the wiring diagram generated with the XML file showing existing cabling connectivity. Then, differences between the XML file showing existing cabling connectivity and the XML file showing desired cabling connectivity are highlighted and presented to the user in a desired way so as enable recovering faulty wiring in the SAN 116.

Figure 7:
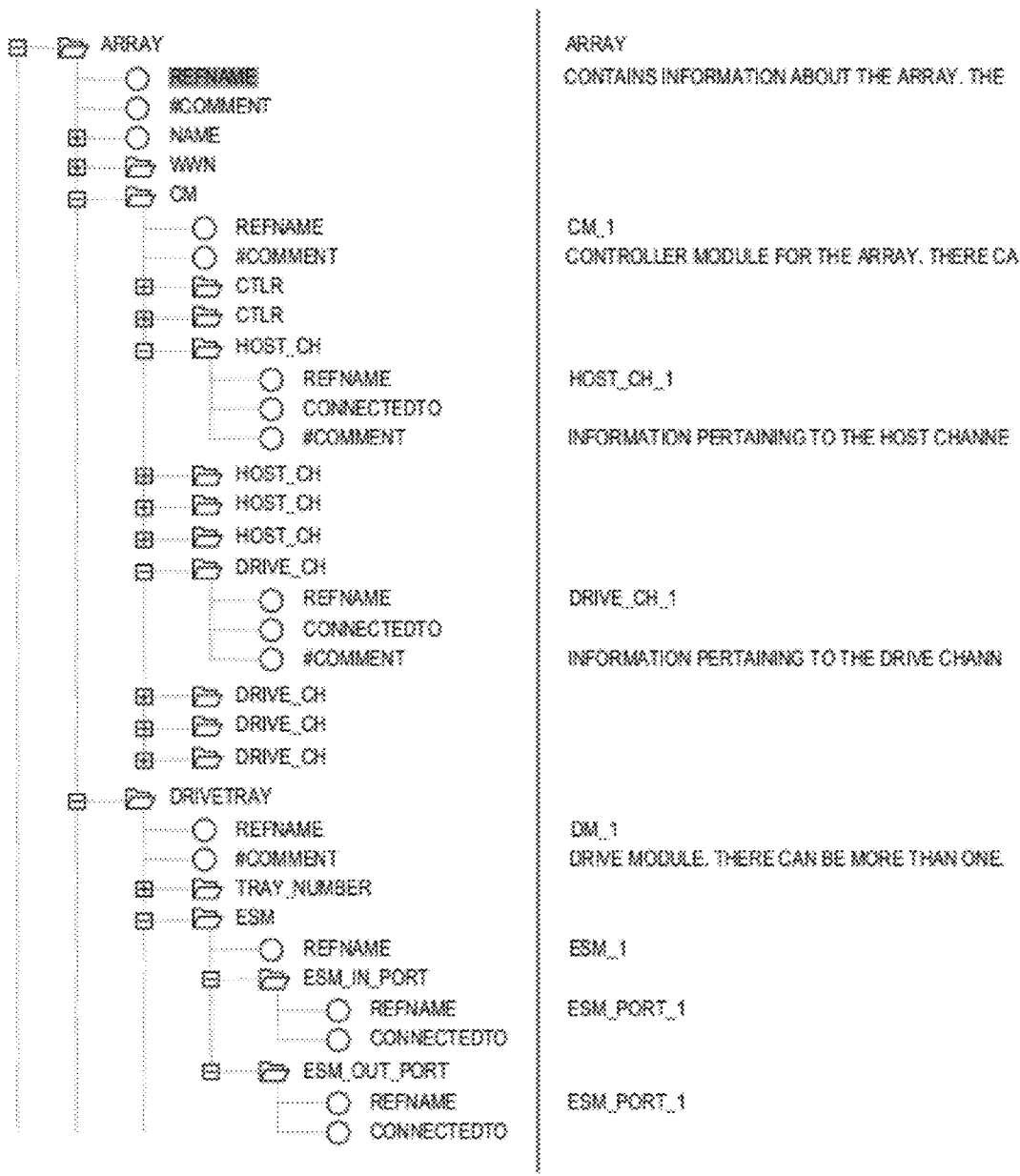
FIG. 7 shows a list of any found miswiring and/or improper cabling information in an XML format using the generated existing and desired cabling connectivity information, such as those shown in FIGS. 5 and 6, according to one embodiment.
Figure 7:
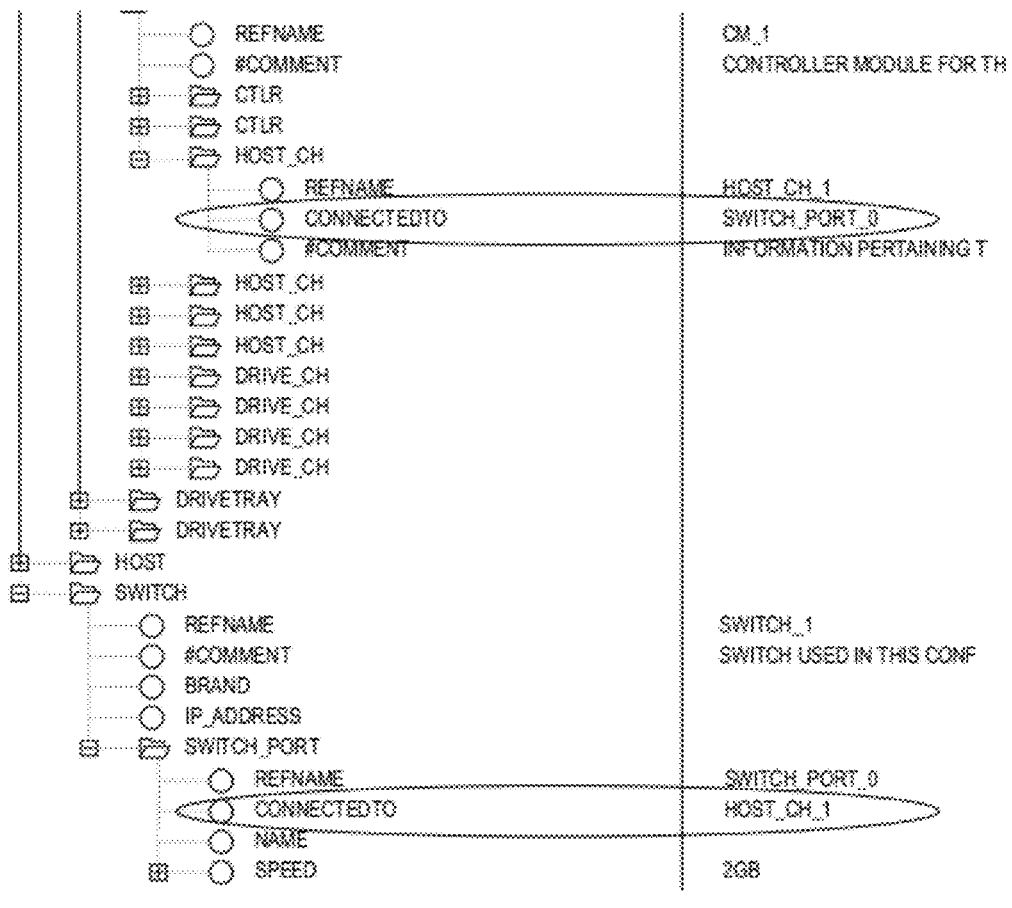

FIG. 7 shows a list 700 of any found miswiring and/or improper cabling information in an XML format using the generated existing and desired cabling connectivity information, such as those shown in FIGS. 5 and 6, according to one embodiment. The XML file showing existing cabling connectivity and the XML file showing desired cabling connectivity are compared and any found miswiring and/or improper cabling information is presented in the XML format to the user.

Figure 8:
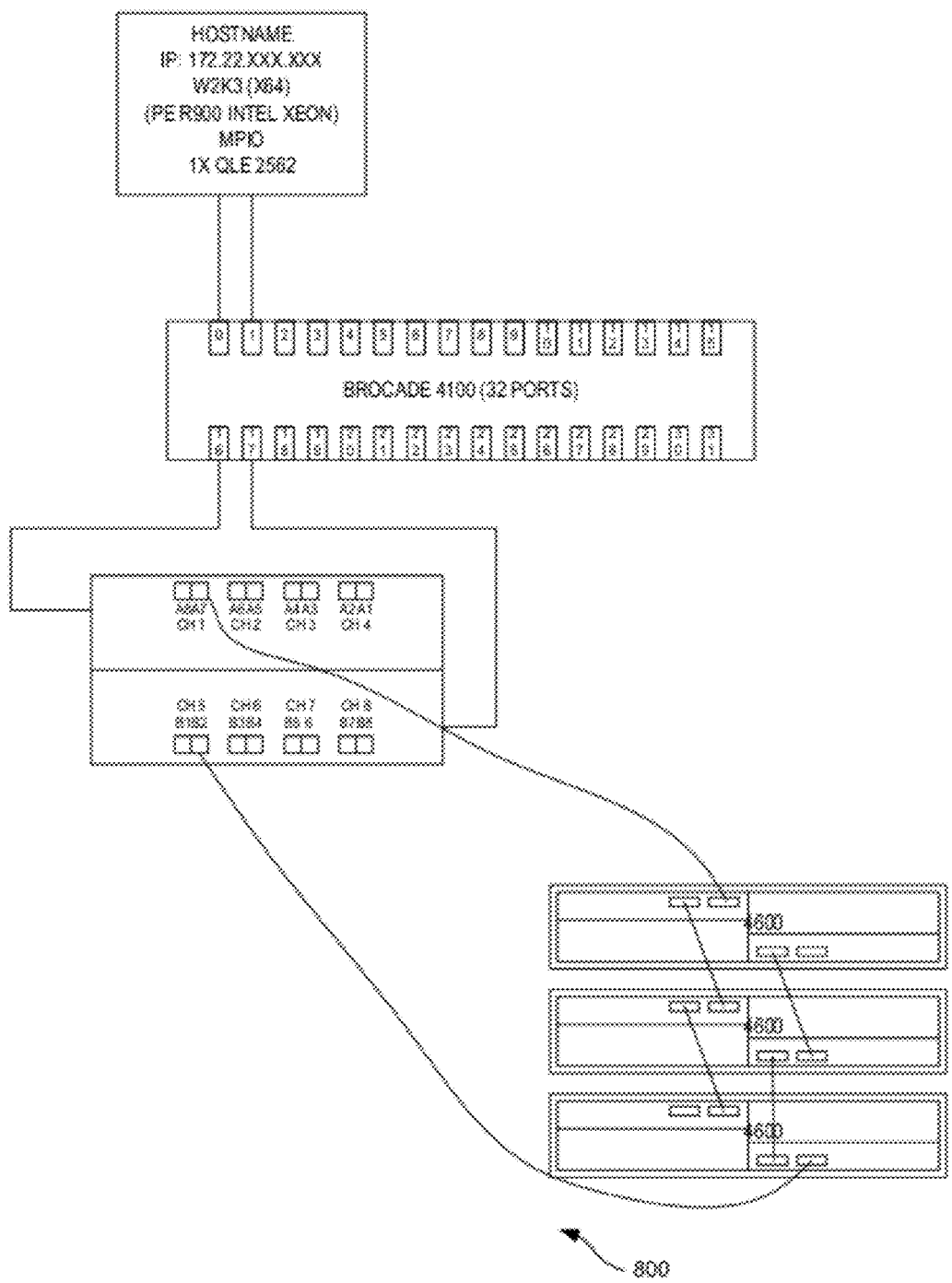
FIG. 8 is a block diagram showing the constructed cabling topology of the SAN including any found miswiring and/or improper cabling using the CTCFIR module, according to one embodiment.

FIG. 8 is a block diagram 800 showing the constructed cabling topology of the SAN 116 including any found miswiring and/or improper cabling using the CTCFIR module 202, according to one embodiment. The constructed cabling topology of the SAN 116 including any found miswiring and/or improper cabling is obtained by comparing the XML file showing existing cabling connectivity and the XML file showing desired cabling connectivity of the SAN 116.

Figure 9:
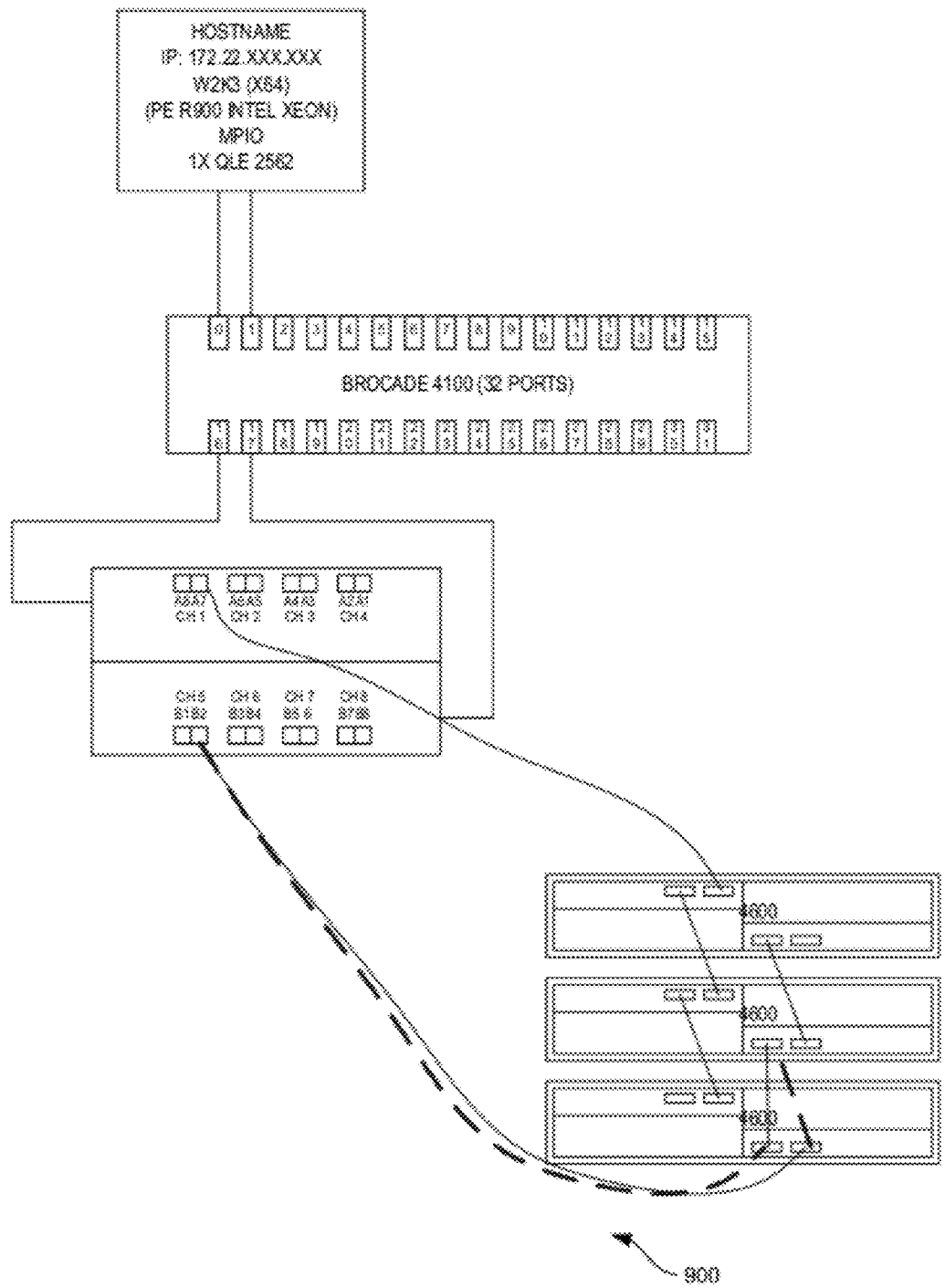
FIG. 9 is a block diagram showing the constructed cabling topology of the SAN including any found miswiring and/or improper cabling and the desired cabling connectivity using the CTCFIR module, according to one embodiment.

FIG. 9 is a block diagram 900 showing the constructed cabling topology of the SAN 116 including any found miswiring and/or improper cabling and the desired cabling connectivity using the CTCFIR module 202, according to one embodiment. The data in the XML file showing existing cabling connectivity and data in the XML file showing desired cabling connectivity are super-imposed and are shown in the figure. The differences obtained by comparing the XML file showing existing cabling connectivity and data in the XML file showing desired cabling connectivity are shown as dotted lines in the figure. The user may use the constructed cabling topology to recover from miswiring and/or improper cabling connectivity in the SAN 116.

Figure 10:
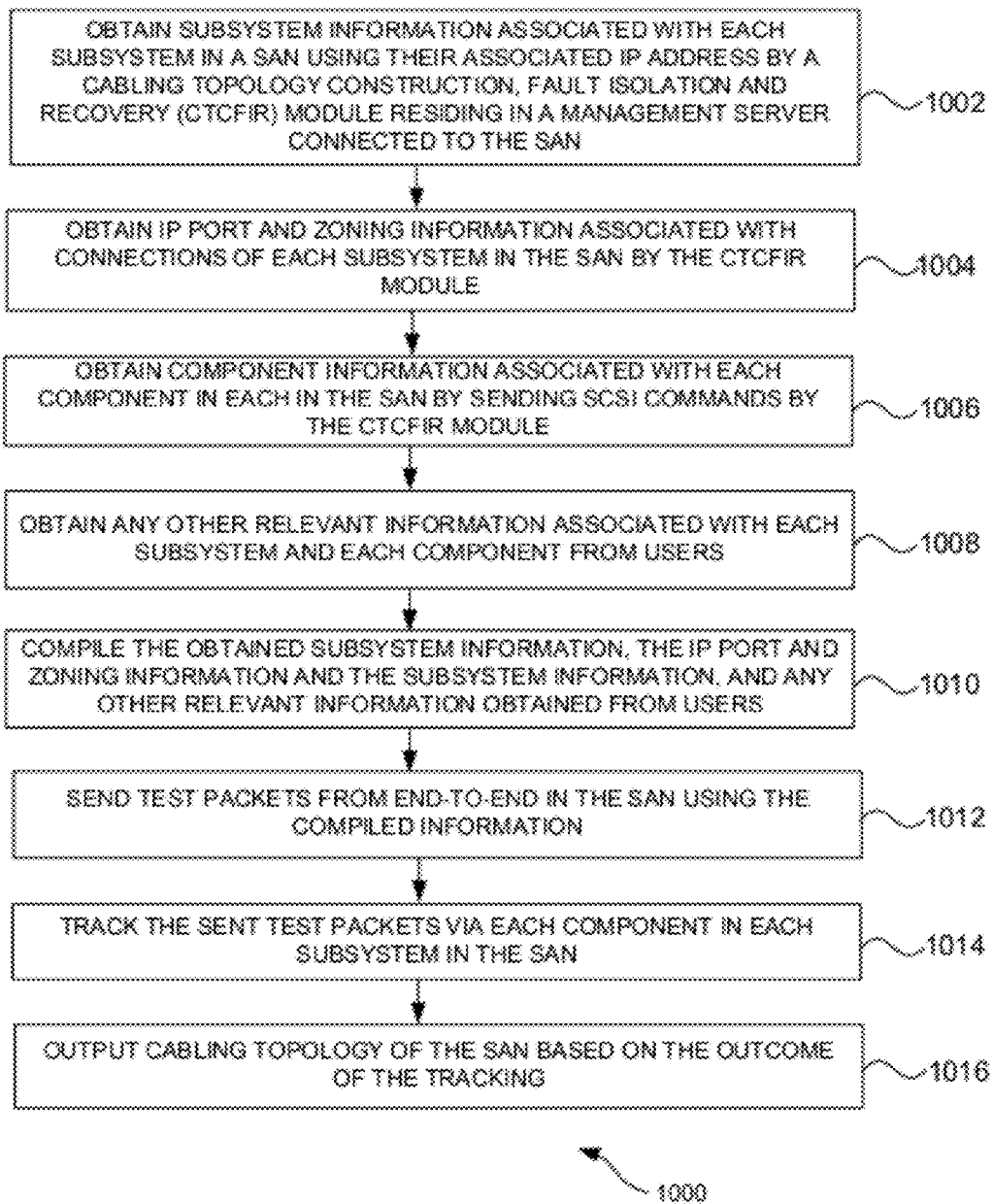
FIG. 10 illustrates a flowchart of a method for construction, fault isolation, and recovery of cabling topology in the SAN, according to one embodiment.

FIG. 10 illustrates a flowchart 1000 of a method for construction, fault isolation, and recovery of cabling topology in a SAN (e.g., the SAN 116 of FIG. 1), according to one embodiment. At step 1002, subsystem information (e.g., hardware, firmware, driver and application software information) associated with each subsystem in the SAN is obtained using its respective IP address by a CTCFIR module 202 (e.g., the CTCFIR module 202 of FIG. 2) residing in a management module (e.g., the management module 112 of FIGS. 1 and 2) of a management server (e.g., the management server 110 of FIG. 1) connected to the SAN. In this embodiment, the subsystem includes one or more hosts, one or more switches, one or more storage array controllers, and one or more databases.

In one example embodiment, the subsystem information associated with each subsystem in the SAN is obtained as follows. The hardware, firmware, driver, and application software information associated with each subsystem in the SAN are obtained. The obtained hardware, firmware, driver and applications software information are compared with a list of recommended firmware and application software information. Then, results of the comparison including any discrepancies found in the firmware, driver, and application software information are outputted.

At step 1004, IP port and zoning information associated with connections of each subsystem in the SAN are obtained by the CTCFIR module. At step 1006, component information associated with each component in each subsystem in the SAN is obtained by sending SCSI commands by the CTCFIR module. For example, the component information includes subsystem name, type of operating system, fail over information, storage tray connected with each storage array, storage array model information, switch model information, cabling harness details, and logon credentials.

At step 1008, any other relevant information associated with each subsystem and each component is obtained from users. At step 1010, the obtained subsystem information, the IP port and zoning information, the component information, and any other relevant information obtained from the users are compiled. At step 1012, test packets (e.g., SCSI frames) are sent (via each IO path) from end-to-end in the SAN using the compiled information. At step 1014, the sent test packets are tracked via each component in each subsystem in the SAN. In one example, the test packets sent via each IP path from end-to-end in the SAN are tracked to obtain component association information to obtain the cabling topology of the SAN.

At step 1016, the cabling topology of the SAN is outputted based on the outcome of the tracking. In one example, the cabling topology of the SAN is outputted as follows. An existing SAN cabling topology XML file is formed based on the outcome of the tracking. Then, a desired SAN cabling topology XML file is formed based on obtained hardware information, IP port and zoning information, and component information for each component. Any existing cabling fault conditions in the cabling topology in the SAN is obtained using the formed existing SAN cabling topology XML file and the desired SAN cabling topology XML file.

Further, for one or more the IO paths, a point of failure is declared if associated test packets are not returned within a predetermined time to the CTCFIR module. In one example, a last point to which the test packet reached is declared as the point of failure. In another example, a point till which the test packet reach with a bottoms up approach when compared to the top down approach from a storage array controller may be declared as the point of failure. Moreover, in one example embodiment, a non-transitory computer-readable storage medium for construction, fault isolation, and recovery of cabling topology in a SAN, having instructions that, when executed by a computing device causes the computing device to perform the method as described above.

In various embodiments, the methods and systems described in FIGS. 1 through 10 detects faults in any segment, host side, switch side, storage array controller side and drive tray side. The above-described methods and systems eliminate the need for manual tracing of the cables and checking. The exact point of failure may be detected quickly without the need for physical verification of the configuration of the SAN. With the help of XML technology, a test engineer or a customer can automatically verify whether the system connectivity match with the test plan in a lab environment and/or a customer setup specification at a customer site. Further, the wiring information obtained using this technique helps the users to duplicate the setup.

Although the present embodiments have been described with reference to specific example embodiments, it will be evident that various modifications and changes may be made to these embodiments without departing from the broader spirit and scope of the various embodiments. Furthermore, the various devices, modules, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

What is claimed is:

1. A method for construction, fault isolation, and recovery of cabling topology in a storage area network (SAN), comprising:
   obtaining subsystem information associated with each subsystem in the SAN using its respective interne protocol (IP) address by a cabling topology construction, fault isolation and recovery (CTCFIR) module residing in a management server connected to the SAN;
   obtaining an IP port and zoning information associated with connections of each subsystem in the SAN by the CTCFIR module;
   obtaining component information associated with each component in each subsystem in the SAN by sending commands by the CTCFIR module;
   compiling the obtained subsystem information, IP port and zoning information, and the component information;
   sending test packets from end-to-end in the SAN using the compiled information;
   tracking the sent test packets via each component in each subsystem in the SAN; and
   outputting the cabling topology of the SAN based on the outcome of the tracking,
   wherein sending the test packets from end-to-end in the SAN using the compiled information comprises sending the test packets via each IO path from end-to end in the SAN using the compiled information.

2. The method of claim 1, wherein obtaining the subsystem information associated with each subsystem in the SAN comprises:
   obtaining hardware, firmware, driver, and application software information associated with each subsystem in the SAN;
   comparing the obtained hardware, firmware, driver and applications software information with a list of recommended firmware, driver and application software information; and
   outputting results of the comparison including any discrepancies found in the firmware, driver and application software information.

3. The method of claim 1, wherein the subsystem includes devices selected from the group consisting of one or more hosts, one or more switches, one or more storage array controllers, and one or more databases.

4. The method of claim 1, wherein the component comprises devices selected from the group consisting of one or more drive trays, one or more drive slots, and one or more disk drives.

5. The method of claim 1, wherein the component information includes information selected from the group consisting of subsystem name, type of operating system, fail over information, storage tray connected with each storage array, storage array model information, switch model information, cabling harness details, and logon credentials.

6. The method of claim 1, wherein tracking the sent test packets via each component in each subsystem comprises:
   tracking the test packets sent via each IP path from end-to-end in the SAN to obtain component association information to obtain the cabling topology of the SAN.

7. The method of claim 1, further comprising:
   declaring a point of failure for one or more the IO paths if associated test packets are not returned within a predetermined time to the CTCFIR module.

8. The method of claim 7, wherein declaring the point of failure for one or more the IO paths if associated test packets are not returned within a predetermined time comprises:
   declaring a last point to which the test packet reached as the point of failure for which each declared point of failure.

9. The method of claim 1, wherein outputting the cabling topology of the SAN based on the outcome of the tracking comprises:
   forming an existing SAN cabling topology XML file based on the outcome of the tracking;
   forming a desired SAN cabling topology XML file based on obtained subsystem information, IP port and zoning information, and component information for each component; and
   obtaining any existing cabling fault conditions in the cabling topology in the SAN using the formed existing SAN cabling topology XML file and the desired SAN cabling topology XML file.

10. A non-transitory computer-readable storage medium for construction, fault isolation, and recovery of cabling topology in a storage area network (SAN), having instructions that, when executed by a computing device causes the computing device to:
    obtaining subsystem information associated with each subsystem in the SAN using its respective interne protocol (IP) address by a cabling topology construction, fault isolation and recovery (CTCFIR)module residing in a management server connected to the SAN;
    obtaining an IP port and zoning information associated with connections of each subsystem in the SAN by the CTCFIR module;
    obtaining component information associated with each component in each subsystem in the SAN by sending commands by the CTCFIR module;
    compiling the obtained subsystem information, IP port and zoning information, and the component information;
    sending test packets via each IO path from end-to-end in the SAN using the compiled information;
    tracking the sent test packets via each component in each subsystem in the SAN; and
    outputting the cabling topology of the SAN based on the outcome of the tracking.

11. The non-transitory computer-readable storage medium of claim 10, wherein obtaining the subsystem information associated with each subsystem in the SAN comprises:
    obtaining hardware, firmware, driver, and application software information associated with each subsystem in the SAN;
    comparing the obtained hardware, firmware, driver and applications software information with a list of recommended firmware, driver and application software information; and outputting results of the comparison including any discrepancies found in the firmware, driver and application software information.

12. A storage area network (SAN) system, comprising:
a SAN, wherein the SAN includes a plurality of subsystems and wherein in each subsystem includes a plurality of components and wherein the SAN further includes a plurality of databases, and wherein the plurality of subsystems, the plurality of components, and the plurality of databases are communicatively coupled via cables;
a management server coupled to the SAN via a network; and
a management module residing in the management server, wherein the management module includes a cabling topology construction, fault isolation and recovery (CTCFIR) module, wherein the CTCFIR module obtains subsystem information associated with each subsystem in the SAN using its respective IP address, wherein the CTCFIR module further obtains an IP port and zoning information associated with cabling connections of each subsystem in the SAN, wherein the CTCFIR module furthermore obtains component information associated with each component in each subsystem in the SAN by sending commands, wherein the CTCFIR module compiles the obtained subsystem information, IP port and zoning information, and the component information, wherein the CTCFIR module sends test packets via each IO path from end-to-end in the SAN using the compiled information, wherein the CTCFIR module tracks the sent test packets via each component in each subsystem in the SAN, and wherein the CTCFIR module outputs the cabling topology of the SAN based on the outcome of the tracking.

13. The SAN of claim 12, wherein the subsystem information comprises information selected from the group consisting of hardware, firmware, driver, and application software information associated with each subsystem in the SAN.

14. The SAN of claim 13, wherein the CTCFIR module compares the obtained hardware, firmware, driver and applications software information with a list of recommended firmware, driver and application software information, and wherein the CTCFIR module outputs results of the comparison including any discrepancies found in the firmware, driver and application software information.

15. The SAN of claim 12, wherein the subsystem comprises devices selected from the group consisting of one or more hosts, one or more switches, one or more storage array controllers, and one or more databases.

16. The SAN of claim 12, wherein the component comprises devices selected from the group consisting of one or more drive trays, one or more drive slots, and one or more disk drives.

17. The SAN of claim 16, wherein the component information includes information selected from the group consisting of subsystem name, type of operating system, fail over information, storage tray connected with each storage array, storage array model information, switch model information, cabling harness details, and logon credentials.

18. The SAN of claim 12,
wherein the CTCFIR module tracks the test packets sent via each IP path from end-to-end in the SAN to obtain component association information to obtain the cabling topology of the SAN, wherein the CTCFIR module declares a point of failure for one or more the IO paths if associated test packets are not returned within a predetermined time to the CTCFIR module, and wherein the CTCFIR module declares a last point to which the test packet reached as the point of failure for which each declared point of failure.

19. The SAN of claim 12, wherein the CTCFIR module forms an existing SAN cabling topology XML file based on the outcome of the tracking, wherein the CTCFIR module forms a desired SAN cabling topology XML file based on obtained subsystem information, IP port and zoning information, and component information for each component, and wherein the CTCFIR module obtains any existing cabling fault conditions in the cabling topology in the SAN using the formed existing SAN cabling topology XML file and the desired SAN cabling topology XML file.

20. A method for construction, fault isolation, and recovery of cabling topology in a storage area network (SAN), comprising:
obtaining subsystem information associated with each subsystem in the SAN;
obtaining connection information of each subsystem in the SAN by the CTCFIR module;
obtaining component information associated with each component in each subsystem in the SAN by sending commands by the CTCFIR module;
sending test packets via each IO path from end-to-end in the SAN using the obtained subsystem information, connection information, and component information;
tracking the sent test packets via each component in each subsystem in the SAN; and
outputting the cabling topology of the SAN based on the outcome of the tracking.

* * * * *